(12) United States Patent
Lacaze et al.

(10) Patent No.: US 11,993,284 B2
(45) Date of Patent: May 28, 2024

(54) AUTONOMOUS WINTER SERVICE VEHICLE

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 81 days.

(21) Appl. No.: 17/678,361

(22) Filed: Feb. 23, 2022

(65) Prior Publication Data
US 2023/0264708 A1    Aug. 24, 2023

(51) Int. Cl.
*B60W 60/00* (2020.01)

(52) U.S. Cl.
CPC ....... *B60W 60/001* (2020.02); *B60W 2300/12* (2013.01); *B60W 2420/408* (2024.01); *B60W 2552/40* (2020.02); *B60W 2555/20* (2020.02)

(58) Field of Classification Search
CPC .......... B60W 60/001; B60W 2552/40; B60W 2555/20; B60W 2300/12; B60W 2420/52
See application file for complete search history.

(56) References Cited

U.S. PATENT DOCUMENTS

| 3,866,342 A * | 2/1975 | Cooper | E01H 5/06 37/267 |
| 9,241,442 B2 | 1/2016 | Diazdelcastillo | |
| 10,073,463 B2 * | 9/2018 | Smith | B62D 15/025 |
| 10,768,003 B2 | 9/2020 | Niewiadomski et al. | |
| 10,920,386 B2 | 2/2021 | Gao et al. | |
| 2001/0047231 A1 * | 11/2001 | Peless | A01D 34/008 701/23 |
| 2014/0180478 A1 * | 6/2014 | Letsky | G05D 1/0231 700/258 |
| 2015/0105974 A1 * | 4/2015 | Kleve | B60W 50/0098 701/36 |
| 2017/0017234 A1 | 1/2017 | Wilson | |
| 2019/0003137 A1 * | 1/2019 | Gao | G01S 15/93 |
| 2019/0323190 A1 | 10/2019 | Waelbers et al. | |

(Continued)

OTHER PUBLICATIONS

Arkin et al, "The Snowblower Problem", 2008, Springer, Algorithmic Foundation of Robotics VII (Year: 2008).*

(Continued)

*Primary Examiner* — Navid Z. Mehdizadeh
*Assistant Examiner* — Kenneth M Dunne
(74) *Attorney, Agent, or Firm* — RowanTree Law Group, PLLC; Frederick F. Rosenberger

(57) ABSTRACT

An autonomous vehicle can comprise winter servicing equipment, such as a snowplow, salt spreader, etc. A controller can be supported by the vehicle and can be operatively coupled thereto. The controller can be configured to control the vehicle to autonomously move through an area along a planned route to effect servicing (e.g., snow removal or remediation) of the area. For example, the controller can be configured to discretize the area into a plurality of cells and to determine a quantity of snow in each cell. The route through the area can be planned by the controller based at least in part on simulated movements of the snow quantities in the cells.

19 Claims, 5 Drawing Sheets

(56) References Cited

U.S. PATENT DOCUMENTS

| | | |
|---|---|---|
| 2020/0310432 A1 | 10/2020 | Ott et al. |
| 2021/0064045 A1* | 3/2021 | Yamamura ........... G05D 1/0257 |
| 2021/0252983 A1* | 8/2021 | Nahrwold ............... B60L 58/12 |
| 2022/0041166 A1* | 2/2022 | Tiwari ................. G06V 10/803 |
| 2022/0371599 A1* | 11/2022 | Prystawski ........ G01C 21/3811 |

OTHER PUBLICATIONS

Craig et al, "Autonomous Snowplow Design", 2013, Ohio University (Year: 2013).*
Hess et al, "Application of Coordinated multi-vehicle formations for snow shoveling on airports", 2009, Springer, (Year: 2009).*
Iddo Eliazar, "The Snowblower Problem", 2003, Kluwer Academic Publishers, whole document (Year: 2003).*

\* cited by examiner

AUTONOMOUS WINTER SERVICE VEHICLE

FIELD

The present disclosure relates generally to autonomous vehicles, and more particularly, to autonomous vehicles for servicing of roadways, parking lots, sidewalks, or other areas in response to, or in anticipation of, winter weather such as snow or ice.

BACKGROUND

Winter service vehicles can remove or otherwise treat winter precipitation (e.g., snow, sleet, freezing rain, ice, etc.) that has accumulated on roadways, parking lots, sidewalks, or other surfaces. For example, such winter service vehicles can include a snowplow and/or a dispenser for applying remediation material to mitigate snow accumulation or ice formation. Typically, the service vehicles are driven by human operators. The routes driven by the service vehicles thus rely on the expertise and prior experience of the human operator to determine an appropriate route and resulting location for any removed snow.

SUMMARY

Embodiments of the disclosed subject matter provide autonomous winter service vehicles, systems including such autonomous vehicles, and methods for operation thereof. Routes for clearing snow and/or applying remediation material (e.g., salt, sand, brine, gravel, etc.) can be automatically determined, for example, by the autonomous vehicle itself or an off-vehicle controller of the system. For example, a route for the autonomous vehicle through a particular area is automatically planned based on simulations of servicing of the area, for example, based on movement of the snow as the area is plowed, movement of water run-off resulting from snow melt, how to distribute remediation material, etc. In some embodiments, a controller of the system can include a planning module that determines an allowable route that services the area at a minimal or optimal cost (e.g., based on time, fuel consumed, distance, snow pile size, vehicle wear, noise produced, area clearance, probability of accident, or any combination of the foregoing). In some embodiments, the system can include a plurality of autonomous vehicles operating in tandem to service an area, for example, by sequentially providing different types of servicing (e.g., plowing, de-icing, etc.) and/or by providing servicing in parallel (e.g., plowing along offset routes to clear a wider area).

In one or more embodiments, a method can comprise discretizing an area to be serviced by one or more winter service vehicles into a plurality of cells, and determining a quantity of snow in each cell. The method can further comprise planning one or more plowing routes through the area based at least in part on simulated movements of snow quantities in the cells. The method can also comprise controlling the one or more winter service vehicles to autonomously move along the planned one or more plowing routes.

In some embodiments, a non-transitory computer-readable storage media can be provided storing computer-executable instructions that, when executed by the one or more processors, cause the one or more processors to perform the disclosed methods.

In one or more embodiments, a system can comprise a motorized vehicle and a controller. The motorized vehicle can comprise winter servicing equipment. The controller can be supported by the motorized vehicle and can be operatively coupled thereto. The controller can comprise at least one processor and memory. The controller can be configured to discretize an area to be serviced by the motorized vehicle into a plurality of cells and to determine a quantity of snow in each cell. The controller can be further configured to plan a route through the area based at least in part on simulated movements of snow quantities in the cells, and to control the motorized vehicle to autonomously move through the area along the planned route.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. For example, in some figures, some components have been illustrated using a partial or cutaway view in order to illustrate internal interaction of components. Throughout the figures, like reference numerals denote like elements. An understanding of embodiments described herein and many of the attendant advantages thereof may be readily obtained by reference to the following detailed description when considered with the accompanying drawings, wherein.

DETAILED DESCRIPTION

I. Introduction

Figure 1A:
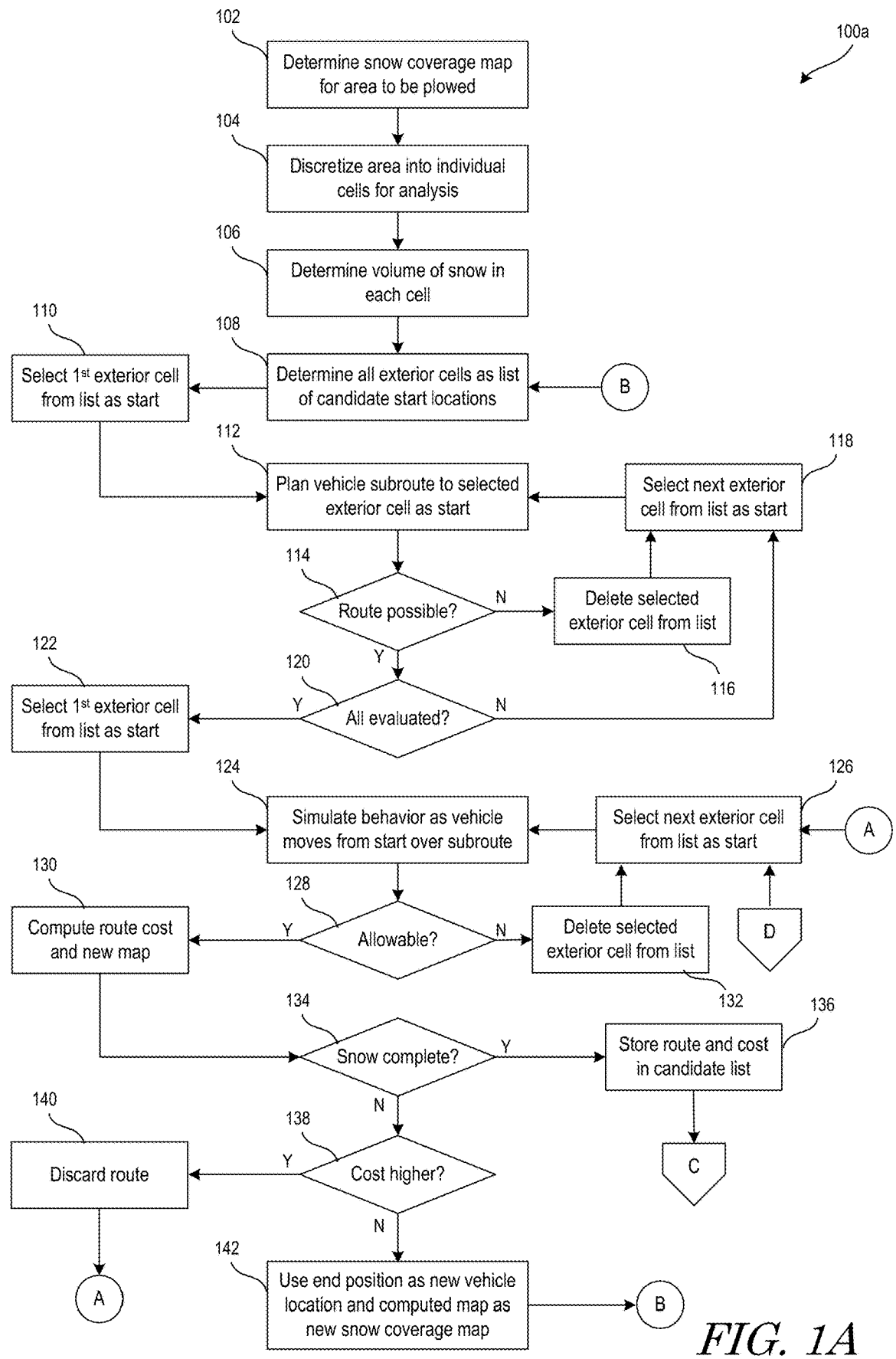
FIGS. 1A-1B are process flow diagrams of an exemplary method for planning a servicing route for an autonomous vehicle, according to one or more embodiments of the disclosed subject matter.

Disclosed herein are one or more autonomous winter service vehicles and systems including such autonomous vehicles. Also disclosed herein are methods for operating autonomous winter service vehicles to perform a desired winter service, e.g., clearing snow and/or applying remediation material (e.g., salt, sand, brine, gravel, etc.). In some embodiments, a controller can automatically determine a route for the autonomous vehicle in performing the winter service. In some embodiments, a route-determining controller can be a part of the autonomous vehicle. Alternatively or additionally, a route-determining controller can be separate from, but in communication with, the autonomous vehicle, for example, a central control system or a controller mounted in a different vehicle.

In some embodiments, the route-determining controller can be configured to automatically plan or determine a route for the autonomous vehicle through a particular area based on simulations of servicing of the area, for example, based on movement of the snow as the area is plowed, movement of water run-off resulting from snow melt, how to distribute remediation material, etc. For example, the autonomous vehicle can have one or more sensors (e.g., a laser detection and ranging (LADAR) system, visible light or infrared cameras, ultrasonic sensors, etc.) configured to detect snow in the area (e.g., distribution, height, and/or other features of the snow), and the controller can be configured to predict where the snow will go as the autonomous vehicle performs a plowing operation. Alternatively or additionally, the controller can employ signals from one or more sensors mounted within or proximal to the area (e.g., a camera viewing an intersection, a camera mounted on a lighting post within a parking lot, etc.) in detecting snow and predicting its movement.

In some embodiments, the controller can partition an area to be serviced into sub-units. The controller can then simulate movement of each sub-unit during servicing operation to determine an optimal route for the autonomous vehicle. For example, the controller can consider the size or quantity of snow (e.g., height and/or weight of a resulting snow pile, etc.), obstacles within the area, and/or servicing restrictions (e.g., sub-units not to be plowed, fire hydrants in the area that should remain unblocked, etc.) in determining the autonomous vehicle route. Alternatively or additionally, the controller can take into account, for example, run-off that results from melting of the snow.

Alternatively or additionally, the controller can determine an optimal route for the autonomous vehicle to distribute remediation material. For example, the controller can employ an algorithm that determines a path through the area so as to distribute equal amounts of remediation material to each sub-unit. For example, the controller can employ a genetic algorithm, an ant colony algorithm (e.g., with pheromone solver), or any other conventional algorithms used to perform traveling salesman type optimizations.

In some embodiments, a controller of the system can include a planning module that determines an allowable route that services the area at a minimal or optimal cost (e.g., based on time, fuel consumed, distance, snow pile size, vehicle wear, noise produced, area clearance, probability of accident, or any combination of the foregoing). In some embodiments, the system can include a plurality of autonomous vehicles operating in tandem to service an area, for example, by sequentially providing different types of servicing (e.g., plowing, de-icing, etc.) and/or by providing servicing in parallel (e.g., plowing along offset routes to clear a wider area).

II. Route Planning Examples

Figure 1B:
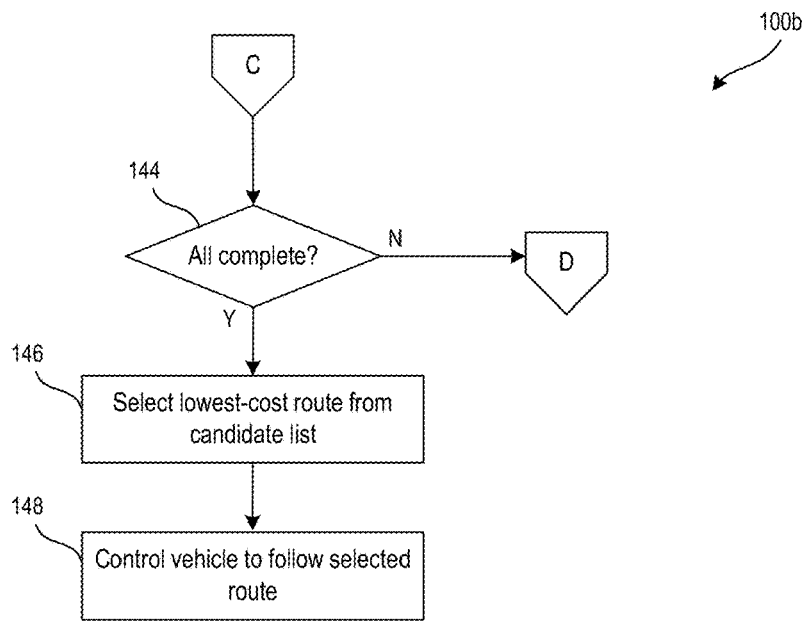

FIGS. 1A-1B show an exemplary method 100a-100b for planning a servicing (e.g., snow plowing) route for an autonomous vehicle. In some embodiments, the method 100a-100b can initiate in response to detection and/or prediction of a winter weather event, for example, by detection of snow falling by a sensor on the autonomous vehicle, by a sensor on another vehicle or within a surrounding area, by a local weather station or command center, and/or by a central control system. Alternatively or additionally, the method 100a-100b can initiate in response to instructions by a human operator, for example, via a user interface of the autonomous vehicle or the central control system.

Referring initially to FIG. 1A, the method 100a can initiate at process block 102, where a snow coverage map for an area to be plowed is determined. For example, the snow coverage map can be determined by a controller mounted in the autonomous vehicle or by a controller separate from but communicating with the autonomous vehicle (e.g., a central control system). In some embodiments, the coverage map can be built based on signals from one or more sensors of the autonomous vehicle, signals from one or more sensors of other vehicles in the area, and/or signals from one or more sensors mounted within the area, for example, which sensors can detect a layout of the area as well as snow and obstacles (or other features) therein. Alternatively or additionally, the coverage map can be built based on prior knowledge of the area, for example, a stored map of the area and/or prior sensor-based mapping of the area without snow.

The method 100a can proceed to process block 104, where the area can be partitioned or discretized into individual sub-units or cells for analysis. For example, the snow coverage map can be partitioned into cells by the controller mounted in the autonomous vehicle (or by a controller separate from, but communicating with, the autonomous vehicle) based on a predetermined discretization scheme. In some embodiments, the discretization scheme comprises partitioning the area into substantially identical cells (e.g., having substantially the same planar area, substantially the same two-dimensional shape, and/or substantially the same planar dimensions). Alternatively or additionally, in some embodiments, the discretization scheme can unevenly partition the area, for example, to provide a greater number of cells and/or cells having smaller planar areas in regions having greater interest or criticality. In some embodiments, the discretization scheme can be selected (e.g., by a human operator, the controller, or both), for example, to provide a balance between simulation processing speed and optimal route plan. Smaller cell sizes can allow for greater fidelity, but at the expense of greater computational burden. Thus, in some embodiments, the cells in some regions of the area (or in different second areas) can be smaller when high fidelity is desired, while in other regions of the area (or in different third areas) where lower computational burden is desired, the cells can be larger.

In some embodiments, each cell can be assumed to be uniform (or substantially uniform) throughout. For example, a depth of the snow can be considered to be constant throughout a particular cell. Alternatively or additionally, a cell can be considered to have no obstacles throughout or to be impassable, for example, due to an obstacle anywhere within the cell. Alternatively or additionally, servicing of a cell can be considered an all-or-nothing proposition, for example, fully plowed or not plowed at all.

In some embodiments, for example, when the winter service vehicle provides plowing of an area, there may be cells on the border or edge of the plow that may be only partially plowed. In some embodiments, different metrics can employed to determine if and/or when to change these cells from an unplowed state (e.g., requiring further servicing to clear snow) to a plowed state (e.g., further servicing not needed), such as 50% plowed, 75% plowed, or 100% plowed. For example, if a border cell originally had a snow depth of 20 cm, and servicing was effective to plow 50% of the snow, then the snow amount for the border cell may be considered to change from 20 cm to 10 cm. Similarly, if the servicing was instead effective to plow 75% of the snow, then the snow amount for the border cell may be considered to change from 20 cm to 5 cm.

In some instances, this partial treatment of cells bordering the plow may present an issue, for example, if the winter servicing vehicle repeated an exact same servicing path. In such instances, the vehicle would plow the same portion of the border cell that was previously plowed, while leaving the unplowed portion of the border cell untouched (e.g., no additional snow would be removed from the border cell). If the vehicle simply treated the border cells on a percentage plowed basis, errors may arise. For example, if the computed amount of snow for a border cell went from 20 cm to 10 cm after a first pass that plows 50% of the cell, then repeating that exact same pass may erroneously suggest another 50% reduction in the snow amount in the border cell (e.g., from 10 cm to 5 cm) even though no additional snow has been removed. In some embodiments, the disclosed systems and/or methods can address the border cell issues, for example, by adjustment of the metrics that determine when the cell is changed to a plow state, by adjustment of cell size, or any combination of the foregoing.

In some embodiments, the cell size may be selected to be sufficiently small such that quantization problems are tolerable. In some embodiments, the size of some or all of the cells can be dependent, at least in part, on a size of the servicing equipment (e.g., width of the plow). For example, if a large plow (e.g., a 4-meter wide plow for an airport runway) is used, then a cell size of 1 square-meter (1-m$^2$) may be tolerable. Alternatively, in some embodiments, if a smaller plow (e.g., a 0.5-meter wide snow blower), then a cell size of 1 square-meter (1-m$^2$) may be too large.

In some embodiments, the snow coverage map and/or the discretization into cells can employ hierarchical maps. For example, a parking lot could be divided into a north section, an east section, a south section, and a west section, with each of the sections further divided into 20 cm cells (e.g., square having 20 cm sides). Alternatively or additionally, in some embodiments, in a quadtree, each cell can be subdivided into four smaller cells (e.g., four equally-sized or different-sized sub-cells). In some embodiments, each of these sub-cells can be subdivided further, and so on. In some embodiments, a hierarchical map can have divisions that are not uniform.

The method 100a can proceed to process block 106, where a volume of snow in each cell can be determined. For example, based on the snow coverage map and the determined cell divisions, the controller mounted in the autonomous vehicle (or a controller separate from, but communicating with, the autonomous vehicle) can estimate a volume of the snow in each cell. The estimate can be based on direct measurements of the snow (e.g., via sensors of the vehicle, sensors of other vehicles, sensors mounted in the area, etc.), snow fall totals (e.g., from a local or central weather station), results of a previous operation or simulation, etc.

Moreover, the consistency of the snow might change during plowing (e.g., from a light powdery snow to a dense watery icy snow pack) or as the snow sits, freezes, and/or melts over time. New snow could also be falling or predicted to fall, and/or winds could cause snow to move or drift. The controller can take into account one, some, or all of these consistency changes in determining the volume of snow in each cell and/or the subsequent movement thereof during simulation of the plowing operation. For example, the snow consistency changes can be modeled, sensed in real time or near real time (e.g., less than 1 second), and/or supplied by outside sources (e.g., a central control system or a local or central weather station).

The method 100a can proceed to process block 108, where a list of cells of the area can be determined as candidate locations for start of an autonomous vehicle route. For example, the cells can be determined by the controller mounted in the autonomous vehicle (or a controller separate from, but communicating with, the autonomous vehicle) based on direct measurements of the area (e.g., via sensors of the vehicle, sensors of other vehicles, sensors mounted in the area, etc.) and/or a stored map of the area. For example, the cells of the area can be exterior cells (e.g., cells at a border of the area and/or facing an exterior of the area) via which the autonomous vehicle may access the area. In some embodiments, the determined list of candidate start locations can be stored, for example, in a database or memory within the autonomous vehicle or separate from, but communicating with, the autonomous vehicle.

The method 100a can proceed to process block 110, where a first candidate location is selected from the candidate start list, and then to process block 112, where a subroute for the autonomous vehicle is planned from its current location outside the area to the selected exterior cell of the area. For example, the subroute to the selected exterior cell can be determined by the controller mounted in the autonomous vehicle, or by a controller separate from, but communicating with, the autonomous vehicle). The method 100a can proceed to decision block 114, where it is determined if the planned subroute to the area is possible (e.g., and/or desirable). For example, there may be restrictions on where the autonomous vehicle can travel, maneuver, and/or service (e.g., plow) en route to the area, such as no-go areas, light poles, buildings, cars, and/or other obstacles surrounding or adjacent to the area. In some embodiments, the controller mounted in the autonomous vehicle (or by a controller separate from, but communicating with, the autonomous vehicle) can take into consideration one or all of the above-noted restrictions to determine whether the planned subroute is possible.

If the subroute is determined to not be possible at decision block 114, the method 100a can proceed to process block 116, where the selected exterior cell is deleted from the candidate start list. The next exterior cell from the candidate start list can then be selected at process block 118, and the method 110*a* can return to process block 112 for evaluation of the next exterior cell. Otherwise, if the subroute is determined to be possible, the method 100*a* can proceed from decision block 114 to decision block 120, where it is determined if all exterior cells in the candidate start list have been evaluated. If any exterior cells in the candidate start list have not been evaluated, the method 110*a* can proceed to process block 118, where the next exterior cell can be selected from the candidate start list, and the method 110*a* can return to process block 112 for evaluation of the next exterior cell.

If all exterior cells in the candidate start list have been evaluated, the method 100*a* can proceed from the decision block 120 to process bock 122, where a first cell is selected from the candidate start list as a candidate start for a route within the area. The method 100*a* can proceed to process block 124, where a further subroute from the selected starting cell is planned and the behavior of the snow within the cell is simulated as the autonomous vehicle moves along the planned subroute. In some embodiments, the planned subroute can extend from the starting cell into one of the cells adjacent to the starting cell, for example, in a substantially straight line based on a current pose or orientation (or predicted pose or orientation from a previous simulation iteration) of the autonomous vehicle. For example, the subroute planning and simulation can be performed by the controller mounted in the autonomous vehicle (or by a controller separate from, but communicating with, the autonomous vehicle).

The method 100*a* can proceed to decision block 128, where it is determined if the planned subroute within the area is allowable (e.g., and/or desirable). For example, there may be restrictions on where the autonomous vehicle can travel, maneuver, and/or service (e.g., plow) within the area, such as no-go areas, light poles, buildings, cars, and/or other obstacles within the area. Alternatively or additionally, there may be portions of the area where it may be undesirable to pile snow, where snow piled on a cell is too large to otherwise be moved by the autonomous vehicle, and/or where insufficient traction is available (e.g., when the autonomous vehicle reverses into an unplowed cell). In some embodiments, the controller mounted in the autonomous vehicle (or by a controller separate from, but communicating with, the autonomous vehicle) can take into consideration one or all of the above-noted restrictions to determine whether the planned subroute is allowable. If the subroute is determined to not be allowable at decision block 128, the method 100*a* can proceed to process block 132, where the selected cell is deleted from the candidate start list. The next cell from the candidate start list can then be selected at process block 126, and the method 110*a* can return to process block 124 for evaluation of the next selected cell.

Otherwise, if the subroute is determined to be possible, the method 100*a* can proceed from decision block 128 to process block 130, where a cost associated with movement of the autonomous vehicle along the subroute is determined, for example by the controller mounted in the autonomous vehicle (or by a controller separate from, but communicating with, the autonomous vehicle). Cost can include, for example, amount of money, time to complete, distance traveled, fuel consumed, wear and tear, amount of remediation material applied, or any combination of the foregoing. Alternatively or additionally, cost can include, for example, noise produced by the servicing operation, amount of snow on predetermined or critical cells or areas, probability of accident (e.g., sliding of the autonomous vehicle into a parked vehicle), size of a snow pile, or any other criteria related to the servicing operation. In some embodiments, in addition to the cost, the controller can also determine a new snow coverage map, for example, by simulating the movement of the snow from the starting cell to adjacent cells in the area as the autonomous vehicle moves along the subroute.

The method 100*a* can proceed to decision block 134, where it is determined if the simulation based on the selected subroute is sufficient to complete removal of snow from the area. In some embodiments, the determination of complete removal may be made when all accessible cells (e.g., where some cells may be unable to be cleared due to obstacles therein, for example, a parked car in a parking lot) have been cleared of snow. Alternatively or additionally, the determination of complete removal may be made when a predetermined percentage of cells are cleared of snow (e.g., when it is desirable for a first pass after a snow storm to clear only a single lane). In some embodiments, the controller mounted in the autonomous vehicle (or a controller separate from, but communicating with, the autonomous vehicle) can determine if the simulated subroute results in complete removal of snow.

If it is determined that snow removal was incomplete at decision block 134 (e.g., if the autonomous vehicle would have to traverse more of the cells in the area to remove snow and thus the current route is unfinished), the method 100*a* can proceed to decision block 138, where it is determined if the total cost associated with the subroute is higher than a previously determined route (e.g., from prior iterations of blocks 124-134). In some embodiments, the controller mounted in the autonomous vehicle (or a controller separate from, but communicating with, the autonomous vehicle) can compare the cost of a determined subroute with that of previously determined routes. If the unfinished route has a higher cost than the previously determined route, the method 100*a* can proceed to process block 140, where the subroute is discarded as a candidate in favor of the previously determined route, for example, to reduce the computational burden.

Instead, if it is determined at decision block 138 that the total cost associated with the subroute is lower than the previously determined route, the method 100*a* can proceed to process block 142, where the position of the autonomous vehicle at the end of the simulated subroute is set as a new starting cell by the controller mounted in the autonomous vehicle (or by a controller separate from, but communicating with, the autonomous vehicle). In some embodiments, the controller can further set the snow coverage map resulting from the simulated movement of the autonomous vehicle along the subroute as the new snow coverage map. The method 100*a* can thus return to process block 108 to compile additional subroutes using the new starting cell and snow coverage map. For example, the end of one simulated subroute becomes the beginning of the next subroute, and the series of subroutes can be concatenated together to form a complete route for servicing of the area.

If it is determined that snow removal was complete at decision block 134 (e.g., snow is removed from all cells of the area that can be accessed by the autonomous vehicle), the method 100*a* can proceed to decision block 136, where the complete route for servicing of the area and its associated cost is stored in a candidate route list (e.g., in a database or memory within the autonomous vehicle or separate from, but communicating with, the autonomous vehicle). The method 100*a* can then proceed to method 100*b* of FIG. 1B, for example, decision block 144, where it is determined if all exterior cells in the candidate start list have been evaluated. If there are cells in the candidate start list that have not been evaluated, the method 100b can proceed from decision block 144 to process block 126 in FIG. 1A, where the next cell from the candidate start list can be selected and then to process block 124 for evaluation of the next selected cell.

If all cells in the candidate start list have been evaluated, the method 100b can proceed from decision block 144 to process block 146, where a lowest-cost route is selected from the candidate route list. For example, a controller mounted in the autonomous vehicle (or a controller separate from, but communicating with, the autonomous vehicle) can select the route from the candidate route list with the lowest determined cost (e.g., as previously computed at process block 130). The method 100b can then proceed to process block 148, where the controller mounted in the autonomous vehicle (or a controller separate from, but communicating with, the autonomous vehicle) controls the autonomous vehicle (e.g., via a drive-by-wire kit thereof) to follow the selected route in performing the snow clearing (e.g., plowing) operation.

Although some of blocks 102-148 in FIGS. 1A-1B have been described as being performed once, in some embodiments, multiple repetitions of a particular process block may be employed before proceeding to the next decision block or process block. In addition, although blocks 102-148 in FIGS. 1A-1B have been separately illustrated and described, in some embodiments, process blocks may be combined and performed together (simultaneously or sequentially). Moreover, although FIGS. 1A-1B illustrate a particular order for blocks 102-148, embodiments of the disclosed subject matter are not limited thereto. Indeed, in certain embodiments, the blocks may occur in a different order than illustrated or simultaneously with other blocks.

Figure 2A:
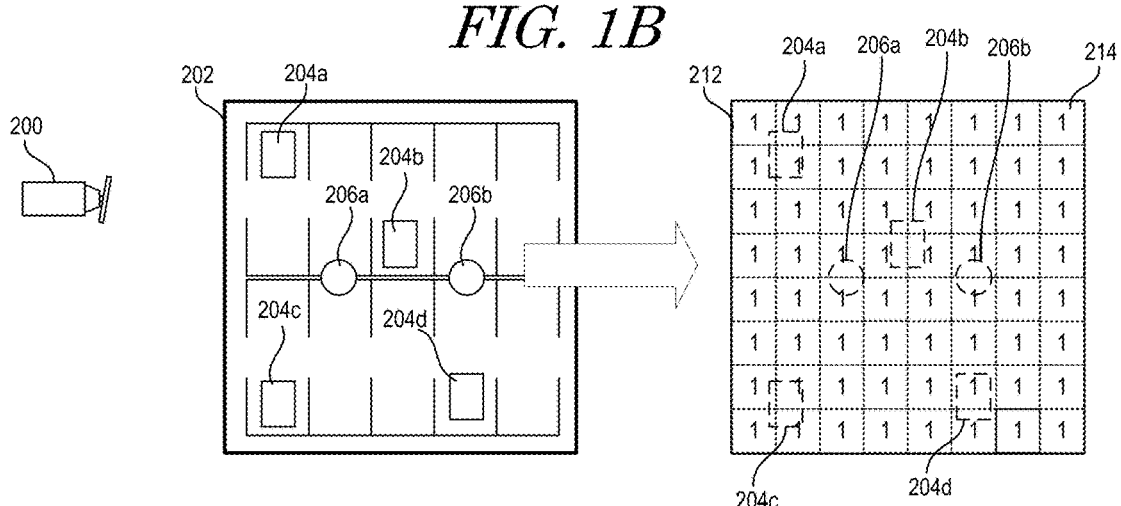
FIG. 2A is a simplified schematic diagram illustrating exemplary discretization of an area for planning of a plowing route for an autonomous winter service vehicle, according to one or more embodiments of the disclosed subject matter.
Figure 2B:
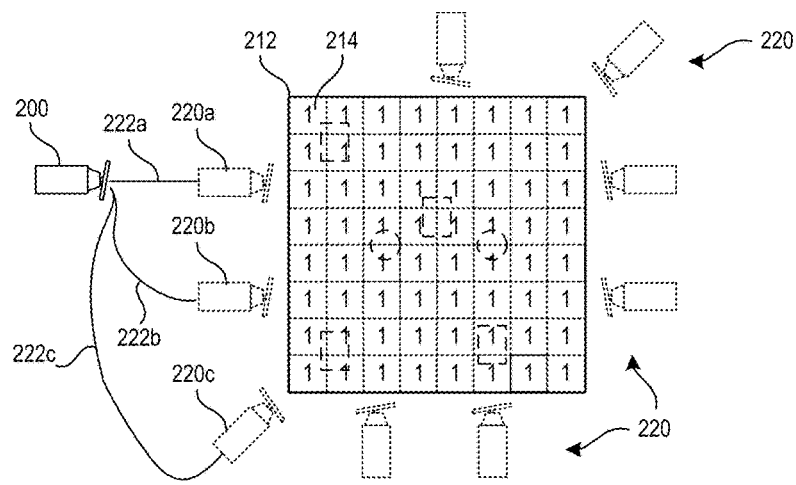
FIG. 2B is a simplified schematic diagram illustrating exemplary starting locations for simulations used in planning of the plowing route for an autonomous winter service vehicle, according to one or more embodiments of the disclosed subject matter.

FIGS. 2A-2B illustrate initial aspects of an exemplary route planning for a winter service vehicle 200 according to some embodiments, for example, to determine a starting point for a plow run. Referring initially to FIG. 2A, the winter service vehicle 200 is outside of an area 202 to be serviced, for example, a snow-covered parking lot with one or more parked vehicles 204a-204d and one or more obstacles 206a-206b (e.g., light poles). In some embodiments, the winter service vehicle 200 can determine a snow map 212 corresponding to the area 202. In some embodiments, the snow map 212 can be broken down into an array of unit cells 214, and the amount of snow in each unit cell estimated. Note that the cell sizes illustrated in FIGS. 2A-4B are drawn for convenience of illustration and description only, and not necessarily representative of an optimal cell size. Moreover, although the unit cells 214 are illustrated as having equal sizes, in some embodiments, one, some, or all of the unit cells 214 can have different sizes, for example, to provide a greater number of cells around regions of interest (e.g., around cars 204a-204d, where errors in route planning may be more likely to result in a collision) and/or to provide a fewer number cells in other regions (e.g., open areas without any parked cars or obstacles). Alternatively or additionally, the size of the cells 214 can be determined based on the amount of snow contained therein, for example, each cell having substantially the same amount of snow (e.g., a unit volume of snow, such as 1 $m^3$).

In some embodiments, all of the exterior cells 214 (e.g., around a perimeter of the rectangular snow map 212 of FIG. 2A) can be identified as potential points of access for the winter service vehicle. For each of these identified exterior cells, a simulated trial vehicle can be placed at the outer side of the cell. In some embodiments, other simulated trial vehicles can be placed at the same cell, but with different poses (e.g., different angles that a longitudinal axis of the vehicle makes with an exterior side of the cell). For each of the trial vehicles and each of the exterior cells, those trial vehicles that overlap a no-go region can be deleted. For example, in some embodiments, the no-region can be (i) a region that cannot be physically accessed by the vehicle, for example, due to a wall, curb, or other obstruction, (ii) a region that is only accessible by trespassing on an adjacent property, (iii) a region that is accessible but is otherwise prohibited by stored rule, or any combination of the foregoing.

For the remaining trial vehicles (e.g., vehicles 220 in FIG. 2B), an optimal path can be planned from the current position of the vehicle 200 to a position adjacent to a respective one of the exterior cells 214. For example, optimal paths 222a-222c can be planned for vehicle 200 to reach the starting locations for simulated trial vehicle 220a-220c, respectively. Other optimal paths (not shown) can be planned for vehicle 200 to reach the other simulated trial vehicles 220 (only a few of which are shown in FIG. 2B). In some embodiments, the optimal path can be determined using a greedy algorithm, for example, Dijkstra's algorithm or other shortest path algorithms. In some embodiments, the optimal path may involve backing up and/or reorienting, which may increase a cost associated with the path. If no path exists between the trial vehicle and the current position of the vehicle, then that trial vehicle can be deleted from further consideration.

Figure 3A:
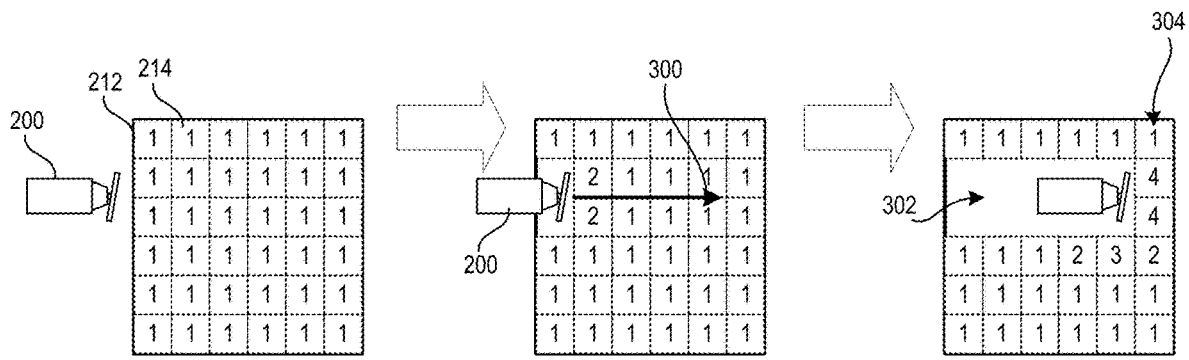
FIGS. 3A-3C are simplified schematic diagrams illustrating simulated snow movements resulting from various plow paths and sequences, according to one or more embodiments of the disclosed subject matter.
Figure 3B:
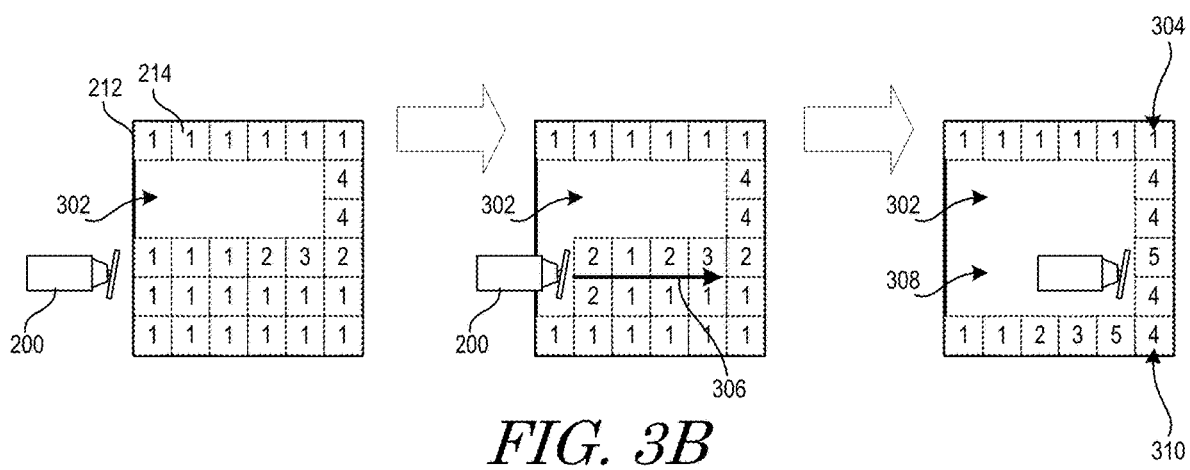

FIGS. 3A-3B illustrate further aspects of an exemplary route planning for winter service vehicle 200 according to some embodiments, for example, to determine a route for a plow run through the area based on one of the trial vehicle starting locations. In the simulation, the vehicle 200 approaches the mapped area 212 from the left, which area has been discretized into unit cells 214, for example, each have a unit of snow therein, with the task of plowing the inner cells of the area. As the vehicle 200 enters the area 212 along route 300, it pushes the snow in the first cells 214 into the adjacent cells on the right, such that adjacent cells now have two units of snow each, as shown in the middle panel of FIG. 3A. As shown in the right panel of FIG. 3A, further progression of the vehicle 200 along route 300 pushes the snow into the cells at the far right, thereby forming a piled snowbank 304 having snow from the other cells along the route 300 and leaving behind plowed region 302.

The simulation can further involve the vehicle 200 plowing the remaining cells, for example, by returning to the left side of the area 212 (e.g., via plowed path 302) and proceeding along route 306 to push the snow into the cells at the far right, as shown in FIG. 3B, thereby forming a piled snowbank 310 having snow from the other cells along the route 306 and leaving behind plowed region 308. In some embodiments the simulation can take into account the plow becoming full as the vehicle 200 proceeds along the planned route, for example, by modeling some snow to be displaced toward adjacent cells (e.g., to the right of vehicle 200 in the far right panels of FIGS. 3A-3B) based on the angle of the plow.

In some embodiments, the route planned through the area 212 can be optimized to minimize cost. For example, during operations, the vehicle 200 starts at its current location, maneuvers to the beginning of a plow run, lowers the plow (and maybe angles it left or right), plows to the end of that run, lifts the plow, and repeats. In some embodiments, the cost to plow the area can be the sum of the costs of each of these individual tasks. In some embodiments, the simulation and associated route planning can also take into account the size of any snow piles, for example, by limiting a height of snow banks 304, 310 (and/or any piles adjacent to cleared regions 302, 308) to be less than a predetermined value and/or by including plowed snow heights in the calculated cost. In some embodiments, the simulation and associated route planning can also take into account snow height with respect to features in the area, for example, to avoid burying a feature desired to remain exposed, such as fire hydrant, building access, utility access, garbage access, etc.

Figure 3C:
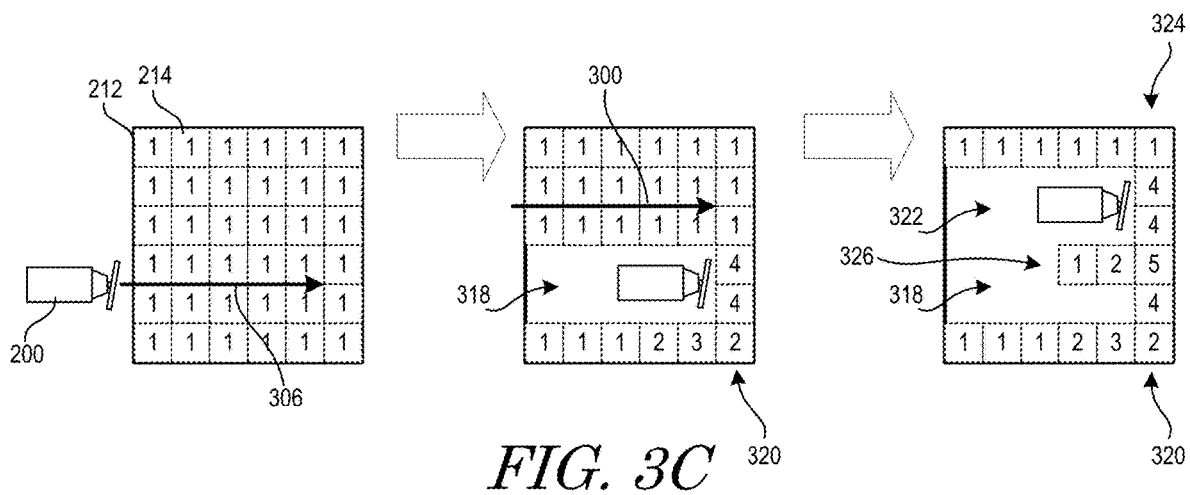

For example, FIG. 3C illustrates clearing of the same area 212 using the same routes 300, 306 as in FIGS. 3A-3B but in a reversed order. In FIG. 3C, the simulation has vehicle 200 proceed along route 306 first to plow region 318 and generate snow bank 320, and then along route 300 second to plow region 322 and generate snow bank 324. As shown in the far right panel of FIG. 3C, after the second pass along route 300, the plow leaves snow in cells 326, which cells were otherwise cleared by the route planning of FIGS. 3A-3B. Since another pass of the vehicle would be required to clear cells 326, the planning of FIG. 3C would have a higher cost than that proposed by FIGS. 3A-3B. If the plow of the vehicle is capable, the plow in the simulation could be angled so that snow slides out to the left of the vehicle and into the border cells at the top of the grid 212; however, this can be considered a different candidate with its own cost calculation. Thus, routes (also referred to herein as trajectories) could be separately explored with the plow angled left as well as with it angled right.

In some embodiments, a simple set of rules or heuristics can produce a desired set of routes to address a relatively simple area layout, for example, the area of FIGS. 3A-3B. Alternatively or additionally, in some embodiments, a route planning module can employ more complex processing, for example, to produce routes that better address complex and/or non-uniform areas, such as a parking lot with light poles and cars parked at random locations.

Figure 3D:
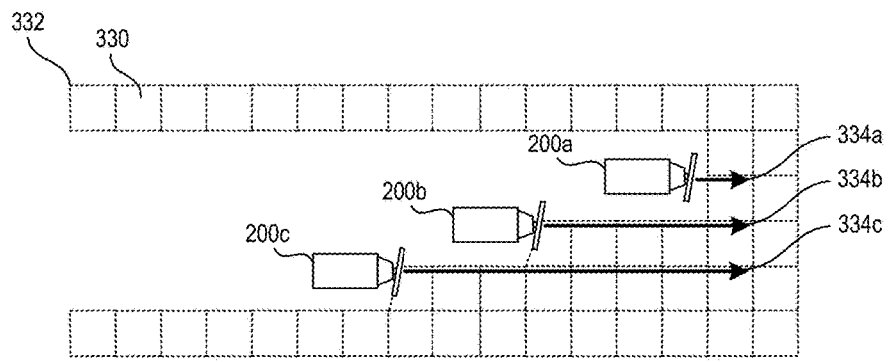
FIG. 3D is a simplified schematic diagram illustrating cooperative plowing by autonomous winter service vehicles, according to one or more embodiments of the disclosed subject matter.

In some embodiments, the simulation and route planning can be applied to determine routes for multiple vehicles operating sequentially or simultaneously. For example, a plurality of winter service vehicles 200a-200c can operate simultaneously to plow an area 330 (e.g., discretized into unit cells 332 for route planning simulation), by following respective offset paths 334a-334c, as shown in FIG. 3D. In some embodiments, the vehicles 200a-200c can communicate with each other (e.g., via wireless transceivers and/or a communication network) to coordinate operations between them, for example, obstacle detection, route determination and changes, servicing start/stop, speed along route, determination of road conditions, etc. In some embodiments, instead of each vehicle 200a-200c providing a plowing function on offset paths, one, some, or all of the vehicles can provide different services and/or may follow the same path. For example, a lead vehicle of a winter servicing convoy can plow snow to initially clear a path, a second vehicle of the convoy can apply remediation material (e.g., salt, sand, deicer, etc.), and a third vehicle of the convoy can provide a signaling service (e.g., to notify surrounding traffic).

Figure 3E:
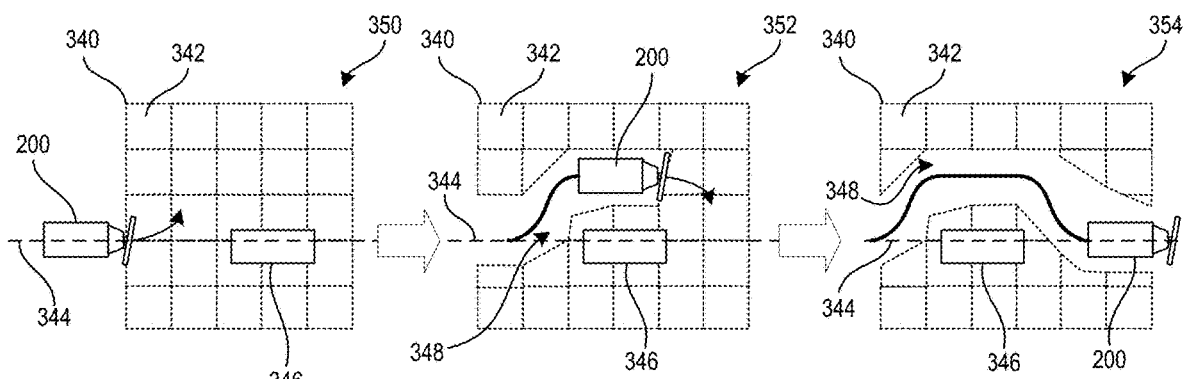
FIG. 3E is a simplified schematic diagram illustrating obstacle avoidance by an autonomous winter service vehicle, according to one or more embodiments of the disclosed subject matter.

In some embodiments, the simulation and route planning can take into account known or previously detected obstacles. For example, FIG. 3E shows a simulation for determining an optimal route for winter service vehicle 200 through area 340 (discretized into unit cells 342) in view of obstacle 346 (e.g., a parked car). In panel 350, the vehicle 200 proceeds along initial trajectory 344 prior to obstacle 346. Since further progression along straight-line trajectory 344 would be prevented by obstacle 346, the simulation can select a deviation 348 to the path that avoids the obstacle 346, as shown at panel 352 in FIG. 3E. After the obstacle, the simulation can select to return to the original trajectory 344, as shown at panel 354 in FIG. 3E. For example, the deviation 348 can be selected so as to maintain a minimum predetermined distance (e.g., at least 3 feet spacing) between the vehicle 200 and the obstacle 346. Alternatively or additionally, in some embodiments, the deviation 348 can be selected based on a resulting height of the plowed snow at or adjacent to the obstacle 346, for example, to avoid burying the obstacle 346 in a snowbank. Alternatively or additionally, the spacing between the vehicle 200 and the obstacle 346 and/or the height of the snow at the obstacle 346 can be included as a factor in the cost analysis performed by the simulation. Alternatively or additionally, in some embodiments, an obstacle can be addressed as the vehicle is following a route already planned by the simulation, for example, to avoid hitting an ad hoc obstacle, such as a pedestrian or stranded car. For example, the control system of the winter service vehicle can allow a temporary deviation from the previously planned path to accommodate the obstacle.

Figure 3F:
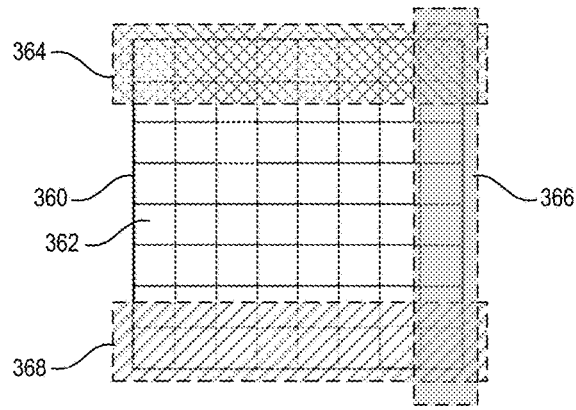
FIG. 3F is a simplified schematic diagram illustrating an exemplary mapping of predetermined service requirements or limitations for an area, according to one or more embodiments of the disclosed subject matter.

In some embodiments, the simulation and route planning can take into account predetermined rules (e.g., user-defined requirements or limitations) for servicing an area. For example, FIG. 3F. For example, FIG. 3F illustrates an area 360 (discretized into unit cells 362 for simulation) with a graphical overlay of exemplary rules 364-368. For example, rule 364 can define a region of area 360 that is not to be serviced (e.g., no plowing of snow), rule 366 can define a region of area 360 upon which snow cannot be dumped, and rule 368 can define a region of area 360 upon which a remediation agent (e.g., salt) cannot be applied. Although FIG. 3F illustrates the predetermined rules in graphical form, embodiments of the disclosed subject matter are not limited thereto, and other forms for storing appropriate rules are also possible according to one or more contemplated embodiments. Moreover, although rules 364-368 have been described above as static and tied to a particular region, the rules can be dynamic (e.g., based on sensor data or operational status) in some embodiments, for example, to define different servicing operations based on weather, temperature, or any other variable (e.g., no dumping of snow in an area if temperature is below a predetermined level, no salting of an area if temperature is below a predetermined level, etc.).

Figure 4A:
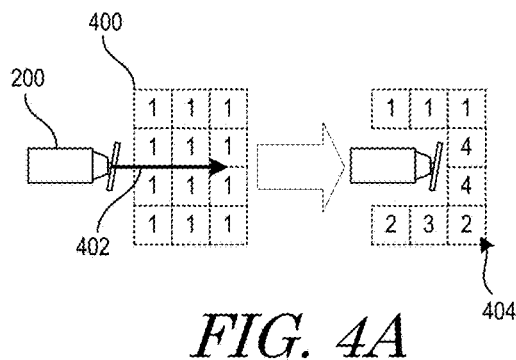
FIGS. 4A-4B are simplified schematic diagrams illustrating different path selection depending on snow conditions, according to one or more embodiments of the disclosed subject matter.
Figure 4B:
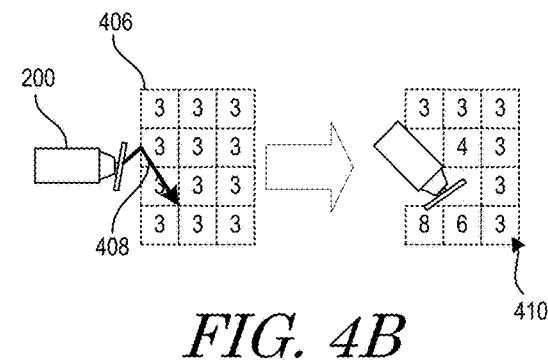

In some embodiments, the simulation and route planning can take into account snow conditions, such as amount of snow in each cell, weight of snow, etc. For example, unit cells that contain snow that is heavier (e.g., "wet" snow) or greater amounts of snow may require shorter routes for the winter service vehicle to properly plow (e.g., to avoid the plow being to heavy to push or exceeding a capacity rating of the plow, to avoid the plowed snow from exceeding a height of the plow, and/or to reduce likelihood of slipping). For example, FIG. 4A illustrates an area 400 with relatively light snow fall, which can be plowed in a single pass along path 402 to form snowbank 404. In contrast, the area 406 in FIG. 4B has three times the snow of area 400. Thus vehicle 200 can follow a shorter path 408 to push the snow into snowbank 410 and can make multiple passes to effect the same clearing as FIG. 4A.

In some embodiments, the simulation and route planning can select routes (and/or subroutes) from a database of predetermined routes (and/or subroutes). In some embodiments, selection of the stored predetermined routes (and/or subroutes) can be based on weather conditions, servicing operations, and/or the area to be serviced. For example, the database can store a first subroute that is used for initial entry into a parking lot when applying a remediation material, a second subroute that is used for initial entry when plowing snow less than a first height, and a third subroute that is used for initial entry when plowing snow greater than the first height. In some embodiments, the simulation and route planning can concatenate together selected subroutes (or routes) to form a planned route that the vehicle can follow in servicing the area. In some embodiments, the predetermined routes (and/or subroutes) can be learned during prior manual operation by a human (e.g., by an operator driving the winter service vehicle through the area while the controller of the vehicle monitors vehicle operation and stores data, or by an operator driving a different vehicle through the area while a controller monitors vehicle operation and stores data).

Although the above-described examples have focused on snow clearing (e.g., plowing), embodiments of the disclosed subject matter are not limited thereto. Rather, the above-described teachings can be readily extended to winter servicing operations (e.g., application of remediation material) other than snow plowing or that operate in conjunction with snow plowing (e.g., salting after plowing). For example, the snow coverage map and associated simulation and route planning processes can be adapted to the particular winter weather (e.g., ice, sleet, freezing rain, etc.). For example, in some embodiments, the method can involve determination of an ice coverage map at process block 102, and the route planning can involve ice removal and/or application of remediation material. In some embodiments, the method can involve determination of a predicted snow map at process block 102, for example, based on historic data and/or weather predictions, and the route planning can involve application of remediation material and/or positioning of the autonomous vehicle for optimal (or at least improved) servicing during or after snow fall.

Moreover, although the above-described examples describe simulation of snow movement as the vehicle moves along a route, other factors related to the winter weather can be simulated in addition to or in place of snow movement. For example, in some embodiments, the movement of water from melted snow and/or the distribution of remediation material (e.g., for even coverage) can be simulated and/or optimized. For example, in some embodiments, the route planning can employ a traveling salesman optimization, such as a genetic algorithm or ant colony optimization algorithm (ACO) (e.g., with pheromone update), to determine paths and equipment operation to distribute equal amounts of salt to portions of the area at a minimal, or at least reduced, cost.

III. Winter Service Vehicle Examples

Figure 5A:
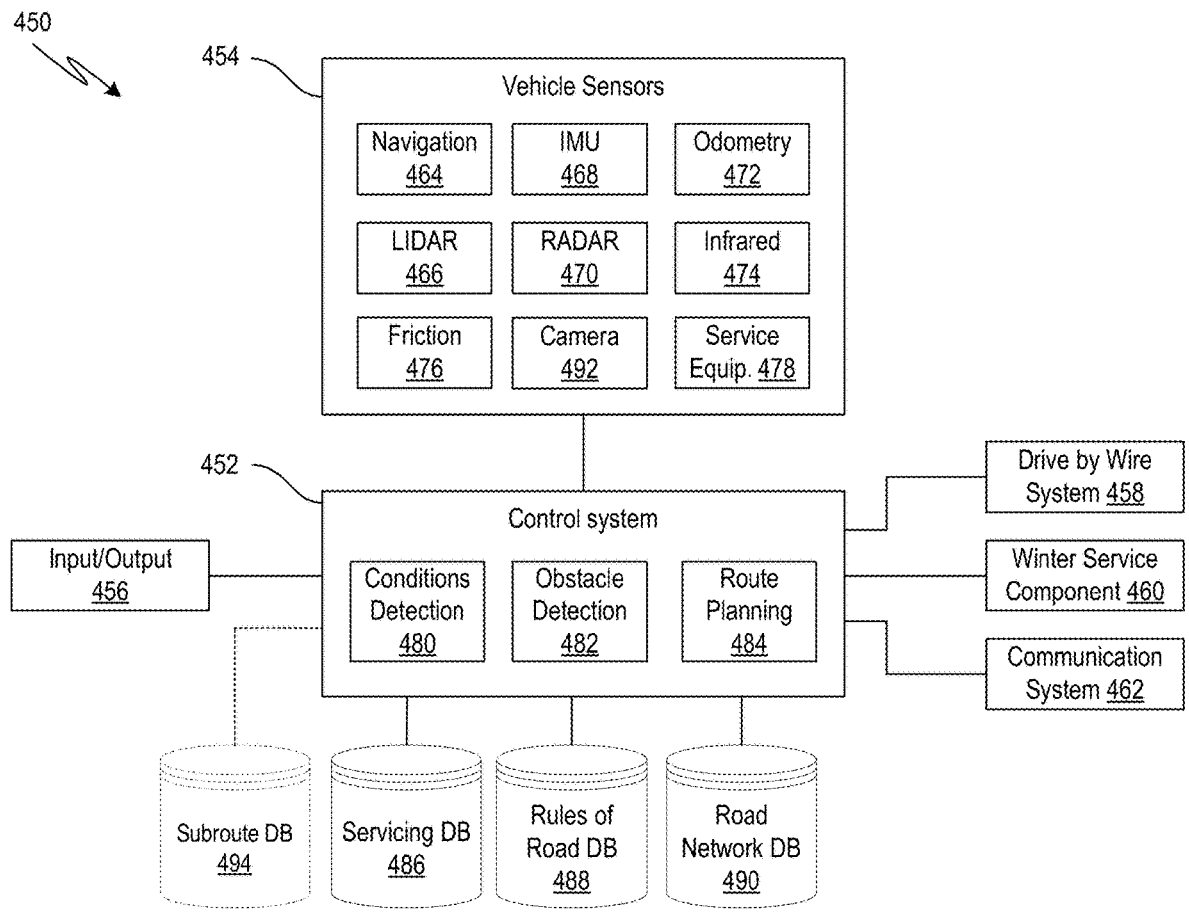
FIG. 5A is a simplified schematic diagram illustrating certain aspects of an on-board operating environment of an autonomous winter service vehicle, according to one or more embodiments of the disclosed subject matter.

FIG. 5A illustrates an exemplary configuration of a winter service vehicle system 450. The system 450 can include a control system 452, one or more vehicle sensors 454, a drive-by-wire system 458, a winter service component 460, and a communication system 462. The drive-by-wire system 458 can include, for example, electrical and/or electro-mechanical components for performing vehicle functions traditionally provided by mechanical linkages, e.g., braking, gearing, acceleration, steering. The winter service component 460 can include one or more components for servicing a roadway or surface subject to winter weather, for example, a static or actuatable snowplow, a front-end loader, a remediation material dispenser (e.g., a spreader for applying salt, grit, sand, gravel etc., or a spray valve for applying deicer (e.g., propylene glycol or ethylene glycol), anti-icer (e.g., brine), etc.), a snow blower (e.g., the snow blower described in U.S. Pat. No. 8,291,623), a snow groomer (e.g., the snow groomer described in U.S. Pat. No. 8,800,700), a snow melter (e.g., the snow melter described in U.S. Pat. No. 9,284,702), a snow sweeper (e.g., the snow sweeper described in U.S. Publication No. 20170101756), or any combination of the foregoing. The communication system 462 can provide wired or wireless communication between the winter service vehicles, other winter service vehicles servicing the same area, other autonomous vehicles traveling in or through the serviced area, and/or remote systems (e.g., a central controller or distributed network).

In some embodiments, the system 450 can further include a user interface 456 and/or one or more memories or databases. For example, the system 450 can include a database 488 that stores driving rules or "rules of the road" and/or database 490 that stores a map of a road network or area in which the winter service vehicle operates. Alternatively or additionally, the system 450 can include a servicing database 486, which can store servicing rules, for example, areas not to be serviced, areas with limitations on type and/or amount of remediation material to be applied, conditions for application of remediation material (e.g., different remediation material for ice versus snow and/or based on ambient temperature), and/or any other criteria pertaining to performance of one or more winter services.

In some embodiments, the system 450 can optionally include a predetermined routes database 494, which can store previously determined routes or subroutes (e.g., determined by control system 452 for previous winter weather events, manually set by a user or operator (e.g., via the user interface 456), and/or learned during prior manual operation of a vehicle) that can be used by control system 452 in planning a route for the winter service vehicle. In some embodiments, the routes or subroutes stored in database 494 can be condition-specific, for example, based on snow height or winter weather type. The control system 452 can select subroutes from database 494 based on detected or predicted weather conditions and can concatenate the selected subroutes to form a planned route.

In some embodiments, the vehicle sensors 454 can include a navigation sensor 464 (e.g., a global positioning system (GPS), etc.), an inertial measurement unit (IMU) 468, an odometry sensor 472, a light detection and ranging (LIDAR) system 466, a radio detection and ranging (RADAR) system 470, an infrared (IR) imager 474, a surface friction sensor 476, a service equipment sensor 478, a visual camera 492, or any combination thereof. Other sensors are also possible according to one or more contemplated embodiments. For example, sensors 454 can further include an ultrasonic or acoustic sensor for detecting distance or proximity to objects, a compass to measure heading, inclinometer to measure an inclination of a path traveled by the vehicle (e.g., to assess if the vehicle may be subject to slippage), ranging radios (e.g., as disclosed in U.S. Pat. No. 11,234,201, incorporated herein by reference), or any combination thereof.

In some embodiments, the navigation sensor 464 can be used to determine relative or absolute position of the winter service vehicle. In some embodiments, IMU 468 can be used to determine orientation or position of the winter service vehicle. For example, the IMU 468 can comprise one or more gyroscopes or accelerometers, such as a microelectromechanical system (MEMS) gyroscope or MEMS accelerometer. In some embodiments, the odometry sensor 472 can detect a change in position of the winter service vehicle over time (e.g., distance). In some embodiments, odometry sensors 472 can be provided for one, some, or all of wheels of the winter service vehicle, for example, to measure corresponding wheel speed, rotation, and/or revolutions per unit time, which measurements can then be correlated to change in position of the winter service vehicle. Alternatively or additionally, the odometry sensors provided for multiple wheels can be used to detect slippage of one or more of the wheels, for example, due to weather conditions. For example, the odometry sensor 472 can include an encoder, a Hall effect sensor measuring speed, or any combination thereof.

In some embodiments, the LIDAR system 466 can use laser illumination to measure distances to obstacles or features within an environment surrounding the winter service vehicle. In some embodiment, the LIDAR system 466 can be configured to provide three-dimensional imaging data of the environment, and the imaging data can be processed (e.g., by the LIDAR system itself or by a module of control system 452) to generate a 360-degree view of the environment. For example, the LIDAR system 466 can include an illumination light source (e.g., laser or laser diode), an optical assembly for directing light to/from the system (e.g., one or more static or moving mirrors (such as a rotating mirror), phased arrays, lens, filters, etc.), and a photodetector (e.g., a solid-state photodiode or photomultiplier).

In some embodiments, the RADAR system 470 can use irradiation with radio frequency waves to detect obstacles or features within an environment surrounding the winter service vehicle. In some embodiment, the RADAR system 470 can be configured to detect a distance, position, and/or movement vector of an obstacle or feature within the environment. For example, the RADAR system 470 can include a transmitter that generates electromagnetic waves (e.g., radio frequency or microwaves), and a receiver that detects electromagnetic waves reflected back from the environment.

In some embodiments, the IR sensor 474 can detect infrared radiation from an environment surrounding the winter service vehicle. In some embodiments, the IR sensor 474 can detect obstacles or features in low-light level or dark conditions, for example, by including an IR light source (e.g., IR light-emitting diode (LED)) for illuminating the surrounding environment. Alternatively or additionally, in some embodiments, the IR sensor 474 can be configured to measure temperature based on detected IR radiation, for example, to assist in classifying a detected feature or obstacle as a person or vehicle.

In some embodiments, the camera sensor 492 can detect visible light radiation from the environment, for example, to determine obstacles or features within the environment. For example, the camera sensor 492 can include an imaging sensor array (e.g., a charge-coupled device (CCD) or complementary metal-oxide semiconductor (CMOS) sensor) and associated optic assembly for directing light onto a detection surface of the sensor array (e.g., lenses, filters, mirrors, etc.). In some embodiments, multiple camera sensors 492 can be provided in a stereo configuration, for example, to provide depth measurements.

In some embodiments, the friction sensor 476 can detect a coefficient of friction, a degree of slippage, or both of a roadway or other surface over which the winter service vehicle traverses. For example, the friction sensor 476 can include a locked wheel friction tester or other friction testing system. In some embodiments, the control system 452 can automatically adjust operation of the winter service vehicle responsively to a signal from the friction sensor 476, for example, to reduce a speed of the winter service vehicle and/or lift a snowplow when the friction sensor signal is indicative of loss of traction.

In some embodiments, the service equipment sensor 478 can detect an operating condition of winter service component 460, for example, a weight upon or applied to a snowplow as the winter service vehicle moves. In some embodiments, the control system 452 can automatically adjust operation of the winter service vehicle responsively to a signal from the service equipment sensor 478, for example, to reduce speed when the service equipment sensor signal is indicative of an increasing or heavier load, to increase speed when the service equipment sensor signal is indicative of a decreasing or light load, and/or to stop when the service equipment sensor signal is indicative of a load exceeding a predetermined value (e.g., a maximum load capacity of the service equipment). For example, the service equipment sensor 478 can include a load cell, strain gauge, pressure sensor, or any other transducer capable of measuring weight or changes therein.

The vehicle sensors 454 can be operatively coupled to the control system 452, such that the control system 452 can receive data signals from the sensors 454 and control operation of the winter service vehicle responsively thereto. In some embodiments, the control system 452 includes one or more modules for operating the winter service vehicle. For example, the control system 452 can include a conditions detection module 480, an obstacle detection module 482, and/or a route planning module 484.

In some embodiments, the route planning module 484 can be configured to plan a route for the winter service vehicle to follow in servicing a particular area. In some embodiments, the route planning module 484 can employ data from the stored rules of the road 488, data regarding the road network or area 490, and/or data regarding servicing 486 to plan a lowest-cost route that services the area while avoiding known or detected obstacles in the environment, for example, as described above with respect to any of FIGS. 1A-4B. In some embodiments, the control system 452 can use signals from the sensors 454 to identify traversable paths through the area, for example, using vehicle position identified by one or more of sensors 464, 468, 472 and/or features identified in the surrounding environment by one or more of sensors 466, 470, 474, 492 to identify lanes in the roadway that may otherwise be covered or obscured by snow.

The control system 452 can control the drive-by-wire system 458 to have the winter service vehicle follow the route planned by the module 484. In some embodiments, the control system 452 can also control the winter service component 460 to perform a desired winter service as vehicle traverses the planned route. Alternatively or additionally, in some embodiments, the control system 452 can control the drive-by-wire system 458 and/or the winter service component 460 based one or more signals received via communication system 462 (e.g., transceiver for wireless communication), for example, to follow another vehicle (e.g., autonomous winter service vehicle, manually-operated winter service vehicle, autonomous non-service vehicle, or manually-operated non-service vehicle) and/or perform a complementary service to another vehicle (e.g., applying salt after plowing by another vehicle, plowing along a path offset from a lead plowing vehicle, etc.).

In some embodiments, the obstacle detection module 482 can be configured to detect obstacles (e.g., impassable road features, other vehicles, pedestrians, etc.) as the winter service vehicle moves, for example, during initial positioning of the winter service vehicle with respect to an area to be service and/or moving the winter service vehicle as it services the area. The control system 452 can be further configured to avoid the detected obstacles, for example, by instructing the winter service vehicle to follow an alternative path.

In some embodiments, conditions detection module 480 can be configured to detect current or imminent winter precipitation, for example, snow, ice, or freezing rain. In some embodiments, the conditions detection module 480 can detect initiation of a winter weather event, for example, for the winter service vehicle to begin servicing. Alternatively or additionally, the conditions detection module 480 can assess a degree of servicing required for an area, for example, by determining a snow coverage map for the area. In some embodiments, the conditions detection module 480 can build the coverage map based on signals from the vehicle sensors 454, signals from one or more sensors of other vehicles in the area, and/or signals from one or more sensors mounted within the area. Alternatively or additionally, the conditions detection module 480 can build the coverage map based on prior knowledge of the area, for example, a stored map of the area and/or prior sensor-based mapping of the area without snow.

In some embodiments, the system 450 can optionally include a user interface 456, which can be configured to receive input from a human operator and/or provide feedback (e.g., tactile, visual, auditory, etc.) to the human operator regarding operation of the winter service vehicle. For example, the input can comprise motion (e.g., rotation of a steering wheel, manipulation of a joystick, toggle of switch, etc.), audio (e.g., voice commands), or both. In some embodiments, the user interface 456 can be used to control operation of the winter service vehicle or components thereof, for example, via respective modules of control system 452 and/or overriding commands issued by modules of control system 452. In some embodiments, the user interface 456 can be configured as a remote work station for teleoperation of the winter service vehicle.

IV. Computer Implementation

Figure 5B:
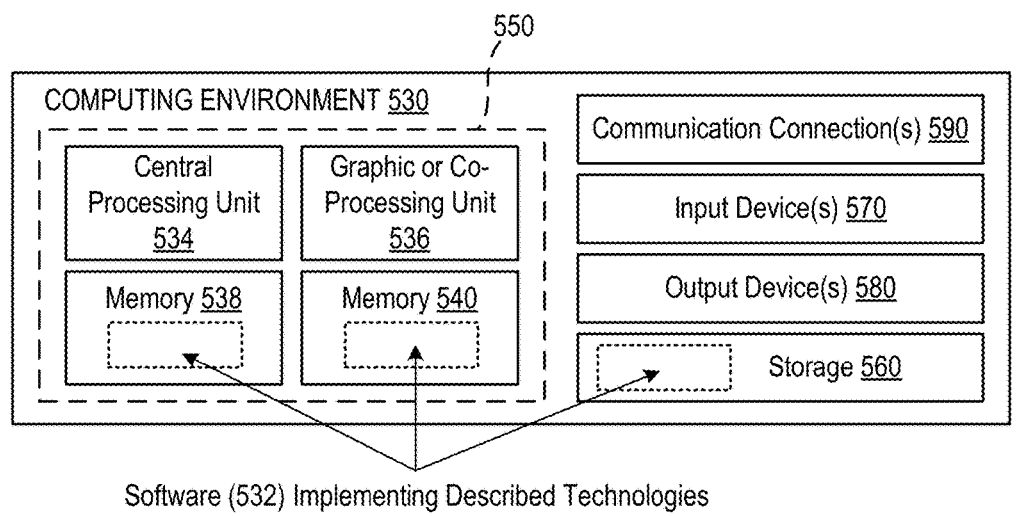
FIG. 5B depicts a generalized example of a computing environment in which the disclosed technologies may be implemented.

FIG. 5B depicts a generalized example of a suitable computing environment 530 in which the described innovations may be implemented, such as aspects of method 100*a*-100*b*, autonomous winter service vehicle 200, and/or control system 452. The computing environment 530 is not intended to suggest any limitation as to scope of use or functionality, as the innovations may be implemented in diverse general-purpose or special-purpose computing systems. For example, the computing environment 530 can be any of a variety of computing devices (e.g., desktop computer, laptop computer, server computer, tablet computer, etc.).

With reference to FIG. 5B, the computing environment 530 includes one or more processing units 534, 536 and memory 538, 540. In FIG. 5B, this basic configuration 550 is included within a dashed line. The processing units 534, 536 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5B shows a central processing unit 534 as well as a graphics processing unit or co-processing unit 536. The tangible memory 538, 540 may be volatile memory (e.g., registers, cache, RAM), non-volatile memory (e.g., ROM, EEPROM, flash memory, etc.), or some combination of the two, accessible by the processing unit(s). The memory 538, 540 stores software 532 implementing one or more innovations described herein, in the form of computer-executable instructions suitable for execution by the processing unit(s).

A computing system may have additional features. For example, the computing environment 530 includes storage 560, one or more input devices 570, one or more output devices 580, and one or more communication connections 590. An interconnection mechanism (not shown) such as a bus, controller, or network interconnects the components of the computing environment 530. Typically, operating system software (not shown) provides an operating environment for other software executing in the computing environment 530, and coordinates activities of the components of the computing environment 530.

The tangible storage 560 may be removable or non-removable, and includes magnetic disks, magnetic tapes or cassettes, CD-ROMs, DVDs, or any other medium which can be used to store information in a non-transitory way, and which can be accessed within the computing environment 530. The storage 560 can store instructions for the software 532 implementing one or more innovations described herein.

The input device(s) 570 may be a touch input device such as a keyboard, mouse, pen, or trackball, a voice input device, a scanning device, or another device that provides input to the computing environment 530. The output device(s) 570 may be a display, printer, speaker, CD-writer, or another device that provides output from computing environment 530.

The communication connection(s) 590 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" or "operator" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as ultra-wideband (UWB) radio, Bluetooth™, Wi-Fi, TDMA, CDMA, 3G, 4G, 4G LTE, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

VI. Conclusion

Any of the features illustrated or described with respect to FIGS. 1A-5B can be combined with any other features illustrated or described with respect to FIGS. 1A-5B to provide systems, methods, devices, and embodiments not otherwise illustrated or specifically described herein. All features described herein are independent of one another and, except where structurally impossible, can be used in combination with any other feature described herein.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the present disclosure.

The invention claimed is:

1. A non-transitory computer-readable storage media storing computer-executable instructions that, when executed by one or more processors, cause the one or more processors to:
   discretize an area to be serviced by one or more winter service vehicles into a plurality of cells;
   determine a quantity of snow in each cell;
   plan one or more plowing routes through the area based at least in part on simulated movements of snow quantities in the cells, the planning the one or more plowing routes comprising:
      selecting an allowable route from a plurality of candidate routes for the one or more winter service vehicles that is simulated to have an associated lowest cost, the selecting an allowable route comprising performing an iterative simulation of snow movement for plow routes originating from different candidate starting vehicle poses and positions within or surrounding the area,
      wherein the associated cost for each candidate route comprises time, fuel consumed, distance, snow pile size, vehicle wear, noise produced, predetermined area clearance, probability of accident, or any combination of the foregoing; and
   control the one or more winter service vehicles to autonomously move along the planned one or more plowing routes.

2. The non-transitory computer-readable storage media of claim 1, wherein the determined quantity of snow in each cell comprises a volume, a depth, or a weight of the snow.

3. The non-transitory computer-readable storage media of claim 1, wherein the computer-executable instructions further comprise instructions that, when executed by the one or more processors, cause the one or more processors to:
   determine the quantity of snow in each cell by estimating the quantity of snow in each cell based on first data received from one or more sensors of the one or more winter service vehicles, on second data received by the one or more winter service vehicles from an external source, or on both the first and second data.

4. The non-transitory computer-readable storage media of claim 1, wherein the one or more winter service vehicles is a plurality of winter service vehicles, and the planned one or more plowing routes is a plurality of respective offset plowing routes that operate in tandem to clear a common path through the area.

5. The non-transitory computer-readable storage media of claim 1, wherein the computer-executable instructions further comprise instructions that, when executed by the one or more processors, cause the one or more processors to:
   receive, from one or more sensors of the one or more winter service vehicles, data indicating an obstacle along or adjacent to the planned one or more plowing routes; and
   control the one or more winter service vehicles to temporarily deviate from the planned one or more plowing routes to avoid said obstacle.

6. The non-transitory computer-readable storage media of claim 1, wherein the computer-executable instructions further comprise instructions that, when executed by the one or more processors, cause the one or more processors to:
   receive, from one or more sensors of the one or more winter service vehicles, data indicating a detected loss of traction; and
   control the one or more winter service vehicles to reduce speed while the loss of traction is detected.

7. The non-transitory computer-readable storage media of claim 1, wherein the computer-executable instructions further comprise instructions that, when executed by the one or more processors, cause the one or more processors to:
   receive, from one or more sensors of the one or more winter service vehicles, data indicating a detected weight of snow on a plow of the one or more winter service vehicles exceeds a predetermined value; and
   control the one or more winter service vehicles to reduce speed while the detected weight of snow on the plow exceeds the predetermined value.

8. The non-transitory computer-readable storage media of claim 1, wherein the computer-executable instructions further comprise instructions that, when executed by the one or more processors, cause the one or more processors to:
   control actuation or operation of servicing equipment installed on the one or more winter service vehicles, wherein the servicing equipment comprises (i) a snowplow, (ii) a spreader for applying salt, sand, gravel or combinations thereof, (iii) a spray valve for applying brine, deicer, or other liquid, (iv) a snow sweeper, (v) a snow blower, or any combination of (i)-(v).

9. The non-transitory computer-readable storage media of claim 1, wherein the computer-executable instructions further comprise instructions that, when executed by the one or more processors, cause the one or more processors to plan the one or more plowing routes by:
   determining the one or more plowing routes for the one or more winter service vehicles so as to avoid a predetermined maximum size of snow in one or more of the cells;
   determining the one or more plowing routes for the one or more winter service vehicles so as to avoid adding, or adding no more than a predetermined quantity of, snow to a portion of the area containing an obstacle or feature to remain exposed;
   determining the one or more plowing routes for the one or more winter service vehicles based at least in part on predetermined servicing limitations or requirements for a part of the area; or
   any combination of the foregoing.

10. A system comprising:
   a motorized vehicle comprising winter servicing equipment; and
   a controller supported by the motorized vehicle and operatively coupled thereto, the controller comprising at least one processor and memory, the controller being configured to:
      discretize an area to be serviced by the motorized vehicle into a plurality of cells;
      determine a quantity of snow in each cell;
      plan a route through the area based at least in part on simulated movements of snow quantities in the cells by:
         selecting an allowable route from a plurality of candidate routes for the motorized vehicle that is simulated to have an associated lowest cost by performing an iterative simulation of snow movement for routes originating from different candidate starting vehicle poses and positions within or surrounding the area,
         wherein the associated cost for each candidate route comprises time, fuel consumed, distance, snow pile size, vehicle wear, noise produced, predetermined area clearance, probability of accident, or any combination of the foregoing; and
      control the motorized vehicle to autonomously move through the area along the planned route.

11. The system of claim 10, wherein the winter servicing equipment comprises (i) a snowplow, (ii) a spreader for applying salt, sand, gravel or combinations thereof, (iii) a spray valve for applying brine, deicer, or other liquid, (iv) a snow sweeper, (v) a snow blower, or any combination of (i)-(v).

12. The system of claim 10, further comprising a communication unit configured to provide wireless communication between the controller and other winter service vehicles, a communications network, a local command center, or a central command center.

13. The system of claim 10, wherein the memory stores information regarding an area or road network traversed by the vehicle, rules for traversing the area or road network, servicing limitations or requirements for the area or road network, or any combination of the foregoing.

14. The system of claim 10, wherein the memory stores predetermined routes or subroutes to be used by the controller in planning the route.

15. The system of claim 10, further comprising at least one sensor supported by the vehicle and configured to provide data signals to the controller, wherein the at least one sensor comprises a navigation unit, an inertial measurement unit, an odometer, LIDAR, RADAR, an infrared imager, an optical imager, a surface friction testing unit, plow force sensor, or any combination of the foregoing.

16. The system of claim 15, wherein the controller is configured to control a speed of the motorized vehicle based at least in part on data signals from the surface friction testing unit, the plow force sensor, or both.

17. A system comprising:
   a motorized vehicle comprising winter servicing equipment; and
   a controller supported by the motorized vehicle and operatively coupled thereto, the controller comprising at least one processor and memory, the controller being configured to:
      discretize an area to be serviced by the motorized vehicle into a plurality of cells;
      determine a quantity of snow in each cell;
      plan a route through the area based at least in part on simulated movements of snow quantities in the cells and such that a height of one or more snow banks formed along a periphery of the area by snow moved by the motorized vehicle following the planned route is less than a predetermined value; and
      control the motorized vehicle to autonomously move through the area along the planned route,
      wherein the controller is configured to plan the route by performing an iterative simulation of snow movement for routes originating from different candidate starting vehicle poses and positions within the area or along the periphery of the area.

18. The system of claim 17, wherein the winter servicing equipment comprises (i) a snowplow, (ii) a spreader for applying salt, sand, gravel or combinations thereof, (iii) a spray valve for applying brine, deicer, or other liquid, (iv) a snow sweeper, (v) a snow blower, or any combination of (i)-(v).

19. The system of claim 17, wherein the controller is configured to plan the route such that one or more snow piles formed adjacent to a cleared region in the area by snow moved by the motorized vehicle following the planned route is less than the predetermined value.

* * * * *